March 31, 1942.                P. T. VAN FLEET                2,278,047
                            POULTRY FOUNTAIN STAND
                             Filed June 11, 1940              2 Sheets-Sheet 1
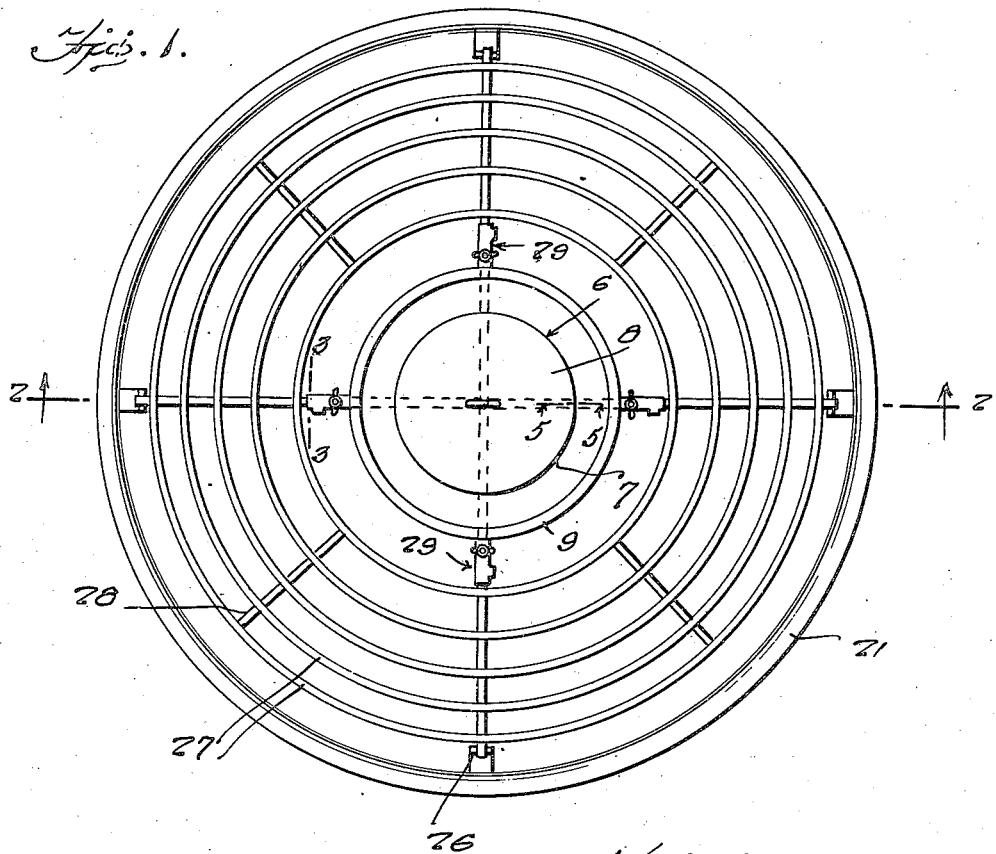
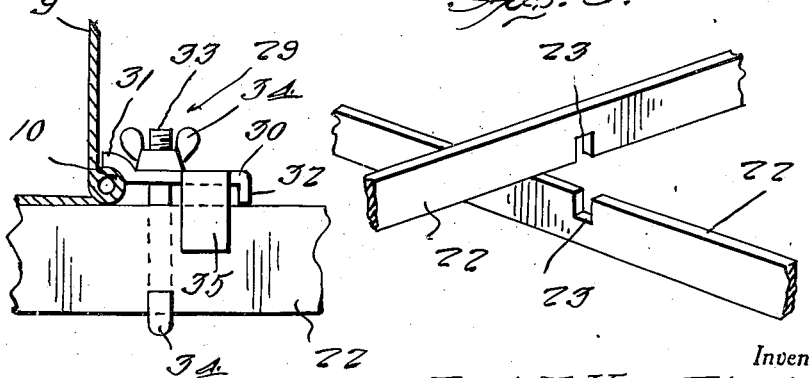
Inventor
Paul T. Van Fleet
By Clarence A. O'Brien
Attorney

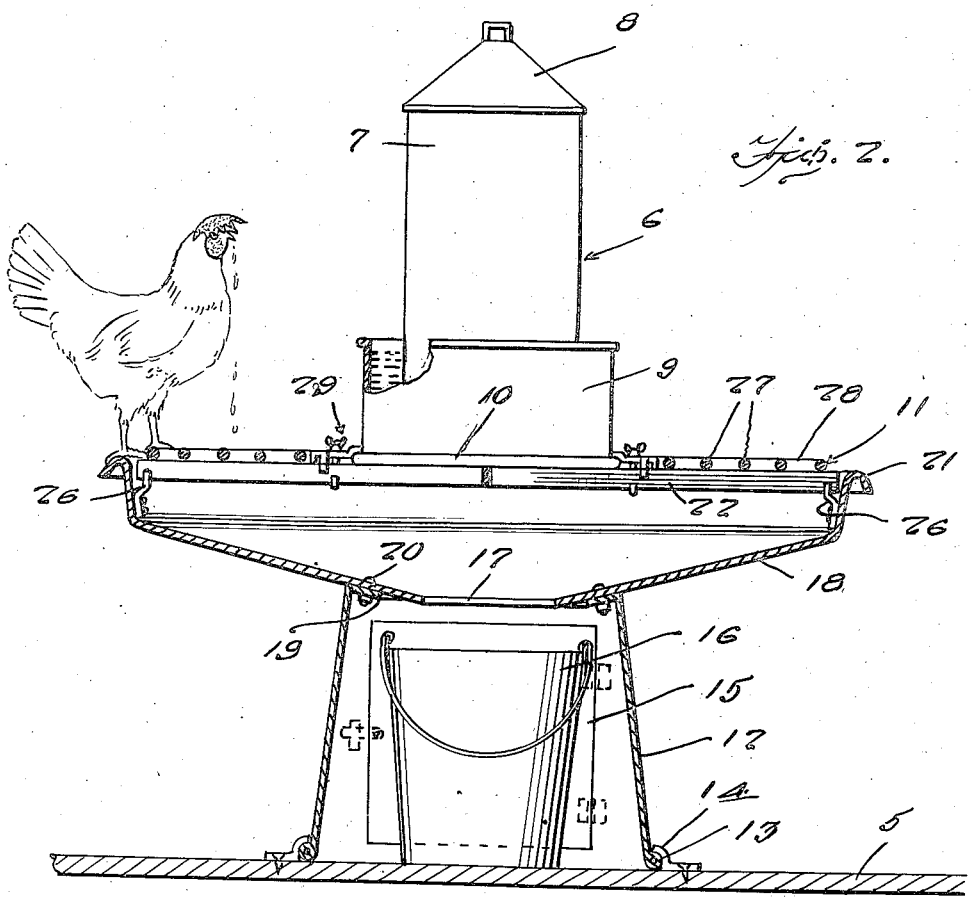

Patented Mar. 31, 1942

2,278,047

UNITED STATES PATENT OFFICE 2,278,047

POULTRY FOUNTAIN STAND

Paul T. Van Fleet, Harrodsburg, Ky.

Application June 11, 1940, Serial No. 339,964

3 Claims. (Cl. 119—77)

The present invention relates to new and useful improvements in animal husbandry and more particularly to a poultry fountain stand.

The principal object of the present invention is to provide a poultry fountain stand with means whereby drippings from the beak and wattle of poultry will be caught and prevented from falling onto the chicken house floor or litter thereon.

Another important object of the invention is to provide a poultry fountain stand which incorporates drip catching means, wherein the parts are constructed in such a manner as to permit ready removal of parts for the purpose of repair or replacement.

Other objects and advantages of the invention will become apparent to the reader of the following specification.

In the drawings:

Figure 1 represents a top plan view of the fountain.

Figure 2 is a vertical sectional view taken substantially on the line 2—2 of Figure 1 with the fountain proper mostly in side elevation.

Figure 3 is a sectional view taken substantially on the line 3—3 of Figure 1.

Figure 4 is a perspective fragmentary exploded view disclosing the means for supporting the crossed bars.

Figure 5 is a fragmentary sectional view taken substantially on the line 5—5 of Figure 1.

Figure 6 is a perspective fragmentary exploded view of the crossed bars.

Referring to the drawings wherein like numerals designate like parts, it can be seen in Figure 2 that numeral 5 denotes a chicken house floor. Numeral 6 denotes a conventional fountain structure consisting of the tank or reservoir 7 having the removable top 8 and the trough 9 at the lower portion thereof. The side wall of this trough and the bottom thereof are generally rolled as at 10.

The present invention is generally referred to by numeral 11 and consists of an upwardly tapering base shell 12 having a rolled lower edge 13 over which the floor attached lugs 14 are disposed for securing the base shell in definite position on the floor 5.

In a side portion of this base shell 12 is a door 15 through which a bucket 16 can be moved. This bucket normally sets on the floor 5 underlying the centrally located opening 17 in a bowl-shaped structure 18. This structure 18 may be referred to as a catch basin for drippings falling from the beaks and wattles of chickens standing on the grille.

As can be seen in Figure 2, the upper edge portion of the base shell 12 is flanged inwardly as at 19 and this is secured by bolts or the like 20 to the bottom of the basin 18.

The upper edge portion of the basin 18 is curved outwardly and downwardly as at 21.

The grille consists, first in the provision of a pair of crossed bars 22—22 which are notched as at 23 on their opposed edges and at their intersecting portions so that they will interlap when properly set, as suggested in Figure 2.

As shown in Figure 4, the lower edges of the bars 22 are notched at their ends as at 24 for disposition into the forked upper ends 25 of the brackets 26 which are secured to the upper inside portions of the basin 18, as clearly shown in Figure 2. Thus the crossed bars 22 are superimposed in a horizontal position and, in turn, support the foot grille consisting of the plurality of annular rods 27 concentrically arranged and to which at equi-distant intervals are suitably secured the radially disposed strengthening members 28. It is upon these rods 27 that the poultry stands when drinking and between which the drippings pass to reach the basin 18.

The foot grille can be readily removed with the cross bars 22 whenever access to the basin 18 is desired.

Clamp devices generally referred to by numeral 29 are employed for securing the fountain 6 to the cross bars 22. Each of these clamps consists of a plate 30 having a curved lug 31 at one end thereof for clamped engagement against a portion of the roll 10 of the trough 9. The other end of the plate 30 has a downwardly disposed lug 32 bearing against the corresponding bar 22.

The plate 30 has an opening therein through which the hook bolt 33 extends, the hook end 34 thereof engaging under the bar 22 while the threaded portion extends upwardly through the plate 30 and is equipped with the wing nut 34. A steadying leg 35 extends downwardly from the plate 30 and against that side of the corresponding bar 22 opposite from the side along which is disposed the bolt 33.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A poultry fountain stand comprising a basin, a horizontally disposed frame work in the top portion of the basin, and adapted for supporting a poultry fountain, an open grill work supported by the frame work; brackets secured internally of the basin to the peripheral wall of the basin, said brackets having forked angular end portions, and said frame work embodying a pair of crossed members each of which is provided in each end thereof with a notch engaging the forked end portion of one of said brackets.

2. A poultry fountain stand comprising a basin, a horizontally disposed frame work in the top portion of the basin and adapted for supporting a poultry fountain, and an open grill work supported by said frame work; and clamp devices for detachably securing a poultry fountain to said frame work, each of said clamp devices embodying a clamping plate designed at one end for engagement with a poultry fountain and having, at the opposite end thereof, a downwardly disposed lug bearing against a part of the frame work, said plate having an opening therein, a hook bolt having the shank thereof extending upwardly through the opening in the clamp plate with the hook end of the bolt engaging an adjacent part of the frame work, and a nut threaded on the shank of the bolt and engaging the topside of the clamp plate, said clamp plate having a lateral depending steadying leg bearing laterally against an adjacent part of said frame work.

3. In combination, a poultry fountain embodying a trough provided at the bottom thereof and externally of the trough with a rolled edge, supporting means for said fountain embodying a horizontally disposed frame work, clamping plates having end portions engaging the rolled edge of the fountain trough, and relatively opposite end portions resting on the frame work, said clamping plates having openings therein, hook bolts having shanks extending vertically upwardly through the openings in said plates with the hook ends of said bolts engaging the frame work, and wing nuts threaded on the free ends of the shanks of said bolts and adapted to be threaded home against said clamping plates, each of said clamping plates having a lateral depending steadying leg laterally abutting an adjacent portion of the frame work.

PAUL T. VAN FLEET.